United States Patent
Jelitto et al.

(10) Patent No.: US 9,292,532 B2
(45) Date of Patent: Mar. 22, 2016

(54) REMOTE DATA STORAGE

(71) Applicant: International Business Machines Corporation, Armonk, NY (US)

(72) Inventors: Jens Jelitto, Rueschlikon (CH); Thomas Mittelholzer, Rueschlikon (CH); Slavisa Sarafijanovic, Rueschlikon (CH); Alessandro Sorniotti, Rueschlikon (CH); Jan Stanek, Rueschlikon (CH)

(73) Assignee: GLOBALFOUNDRIES INC., Grand Cayman (KY)

(*) Notice: Subject to any disclaimer, the term of this patent is extended or adjusted under 35 U.S.C. 154(b) by 0 days.

(21) Appl. No.: 14/451,778

(22) Filed: Aug. 5, 2014

(65) Prior Publication Data

US 2015/0067331 A1    Mar. 5, 2015

(30) Foreign Application Priority Data

Aug. 30, 2013 (GB) .................................. 1315434.9

(51) Int. Cl.
*G06F 17/30* (2006.01)
*H04L 29/06* (2006.01)

(52) U.S. Cl.
CPC .... *G06F 17/30156* (2013.01); *G06F 17/30312* (2013.01); *H04L 63/0428* (2013.01)

(58) Field of Classification Search
CPC .................. G06F 17/30156; G06F 17/30312; H04L 63/0428
USPC ....................................................... 713/168
See application file for complete search history.

(56) References Cited

U.S. PATENT DOCUMENTS

| | | | |
|---|---|---|---|
| 8,199,911 B1 | 6/2012 | Tsaur et al. | |
| 2002/0188605 A1* | 12/2002 | Adya et al. | 707/4 |
| 2007/0156586 A1* | 7/2007 | Kerschbaum | 705/50 |
| 2007/0240224 A1* | 10/2007 | Agrawal et al. | 726/25 |
| 2011/0060759 A1* | 3/2011 | Fienblit et al. | 707/770 |
| 2012/0210382 A1* | 8/2012 | Walker et al. | 725/115 |

FOREIGN PATENT DOCUMENTS

WO    2009134662 A2    11/2009

OTHER PUBLICATIONS

L. Aronovich, et al., "The Design of a Similarity Based Deduplication System," In Proceedings of SYSTOR 2009: The Israeli Experimental Systems Conference, May 4-6, 2009, pp. 1-14.

G. Ateniese, et al., "Secret Handshakes with Dynamic and Fuzzy Matching," CERIAS Tech Report 2007-24, In Network and Distributed System Security Symposuim. The Internet Society, 2007, pp. 1-20.

(Continued)

*Primary Examiner* — Jung Kim
*Assistant Examiner* — Thomas Ho
(74) *Attorney, Agent, or Firm* — Cantor Colburn LLP

(57) ABSTRACT

A computer-implemented method for performing remote data storage includes providing, by at least one client, files to be stored on a remote server, evaluating popularity of the files, and storing the files on the server in a form that depends on the popularity of the files. Files with a first level of popularity are stored in a deduplicated form and files with a second level of popularity are stored in an encrypted form, the first level of popularity being higher than the second level of popularity.

16 Claims, 3 Drawing Sheets

(56) References Cited

OTHER PUBLICATIONS

M. Bellare, et al., "Message-Locked Encryption and Secure Deduplication," Full Version—Eurocrypt, LNCS 7881, Mar. 2013, pp. 1-29.
M. Bellare, et al., "Message-Locked Encryption and Secure Deduplication," Preliminary Version—Eurocrypt, LNCS 7881, Cryptology ePrint Archive, 2012, pp. 296-312.
R. Di Pietro, et al., "Boosting Efficiency and Security in Proof of Ownership for Deduplication," In Proceedings of the 7th ACM Symposium on Information, Computer and Communications Security, ASIACCS '12, May 2-4, 2012, ACM, pp. 1-10.
John R. Douceur, et al., "Reclaiming space from duplicate files in a serverless distributed file system," In Proceedings of the 22nd International Conference on Distributed Computing Systems (ICDCS•02), 2002, starting from p. 617, Washington, DC, USA, 2002. IEEE Computer Society; pp. 1-14.
J. Douceur, "The Sybil Attack," In Peer-to-peer Systems, IPTPS 2002, LNCS 2429, pp. 251-260, 2002.
M. Dutch, "Understanding Data Deduplication Ratios," SNIA—Data Management Forum, Jun. 2008, pp. 1-13.
C. Fan, et al., "Hybrid Data Deduplication in Cloud Environment," International Conference on Information Security and Intelligence, IEEE, 2012, pp. 174-177.
S. Goldwasser, et al., "Probabilistic Encryption," Journal of Computer and System Sciences, 28, 1984, pp. 270-299.
S. Halevi, et al., "Proofs of Ownership in Remote Storage Systems," CCS '11, ACM, Oct. 17-21, 2011, pp. 1-10.
D. Harnik, et al., "Side Channels in Cloud Services, the case of deduplication in cloud storage," Security and Privacy, IEEE, vol. 8, Issue 6, Nov.-Dec. 2010, pp. 1-7.
D. Harnik, et al., "Estimation of Deduplication Ratios in Large Data Sets," In Mass Storage Systems and Technologies (MSST), 2012 IEEE 28th Symposium on, Apr. 2012, pp. 1-11.
Jia Xu, et al., "Leakage-resilient client-side deduplication of encrypted data in cloud storage," Cryptology ePrint Archive, Report 2011/538, 2011, pp. 1-15.
IPO UK Search Report, Application No. GB1315434.9, Patents Act 1977: Search Report Under Section 17(5), Date Mailed: Jan. 28, 2014, pp. 1-3.
N. Mandagere, et al., "Demystifying Data Deduplication," Middleware '08 Companion, ACM, Dec. 1-5, 2008, pp. 1-6.
D. Meister, et al., "Multi-Level Comparison of Data Deduplication in a Backup Scenario," In Proceedings of SYSTOR '09: The Israeli Experimental Systems Conference, May 4-6, 2009, pp. 1-12.
W. Ng, et al., "Private Data Deduplication Protocols in Cloud Storage," SAC '12, ACM, Mar. 25-29, 2012, pp. 1-6.
F. Rashid, et al., "Secure Enterprise Data Deduplication in the Cloud," IEEE Sixth International Conference on Cloud Computing, 2013, pp. 1-9.
Mark W. Storer, et al, "Secure data deduplication," In Proceedings of the 4th ACM international workshop on Storage security and survivability, StorageSS •08, New York, NY, USA, ACM, Oct. 31, 2008, pp. 1-10.

* cited by examiner

REMOTE DATA STORAGE

FOREIGN PRIORITY

This application claims priority to Great Britain Application No. 1315434.9, filed 30 Aug. 2013, and all the benefits accruing therefrom under 35 U.S.C. §119, the contents of which in its entirety are herein incorporated by reference.

BACKGROUND

The invention relates to the field of computer science, and more specifically, to a computer-method implemented, a computer program, a data storage medium and a system for performing remote data storage.

Nowadays, more and more corporate and private users outsource their data to cloud storage providers. With the rapidly increasing amounts of data produced worldwide, networked and multi-user storage systems are becoming very popular, thanks to their accessibility and moderate cost.

In this context, various cost-effective storage optimization techniques are developed to save space, owing to the total sizes of data at stake. The effectiveness of storage efficiency functions, such as compression and deduplication, is an objective for both storage provider and customer: indeed, high compression and deduplication ratios allow optimal usage of the resources of the storage provider, and consequently, lower cost for its users.

Several deduplication schemes have been proposed by the research community, for example in the following papers:
Dirk Meister and André Brinkmann. *Multi-level comparison of data deduplication in a backup scenario. In Proceedings of SYSTOR 2009: The Israeli Experimental Systems Conference, SYSTOR '09*, pages 8:1-8:12, New York, N.Y., USA, 2009. ACM;
Nagapramod Mandagere, Pin Zhou, Mark A Smith, and Sandeep Uttamchandani. *Demystifying data deduplication. In Proceedings of the ACM/IFIP/USENIX Middleware '08 Conference Companion, Companion '08*, pages 12-17, New York, N.Y., USA, 2008. ACM; or
Lior Aronovich, Ron Asher, Eitan Bachmat, Haim Bitner, Michael Hirsch, and Shmuel T. Klein. *The design of a similarity based deduplication system. In Proceedings of SYSTOR 2009: The Israeli Experimental Systems Conference, SYSTOR '09*, pages 6:1-6:14, New York, N.Y., USA, 2009. ACM.

At the same time, recent data breach incidents make security an increasingly prominent requirement. Indeed, one obstacle still prevents many users from migrating data to remote storage: data security. The conventional means to address concerns over the loss of governance for outsourced data is to encrypt it before it leaves the premises of its owner.

While sound from a security perspective, this approach prevents the storage provider from applying any space- or bandwidth-saving functions, such as deduplication. On the other hand, most works related to deduplicating systems do not consider security as a concern.

Recently however, a paper has presented a number of attacks that can lead to data leakage in storage systems in which client-side deduplication is in place: D. Harnik, B. Pinkas, and A. Shulman-Peleg. *Side channels in cloud services: Deduplication in cloud storage. Security Privacy, IEEE*, 8(6):40-47, November-December 2010.

To thwart such attacks, the concept of proof of ownership has been introduced in the following papers:
Shai Halevi, Danny Harnik, Benny Pinkas, and Alexandra Shulman-Peleg. *Proofs of ownership in remote storage systems. In Proceedings of the 18th ACM conference on Computer and communications security, CCS '11*, pages 491-500, New York, N.Y., USA, 2011. ACM; and
Roberto Di Pietro and Alessandro Sorniotti. *Boosting efficiency and security in proof of ownership for deduplication. In Proceedings of the 7th ACM Symposium on Information, Computer and Communications Security, ASIACCS '12*, pages 81-82, New York, N.Y., USA, 2012. ACM.

None of these works, however, can provide real end-user confidentiality in presence of a malicious or honest-but-curious cloud provider.

Also known is a PoW scheme that allows client-side deduplication in a bounded leakage setting, as presented in the following paper: Jia Xu, Ee-Chien Chang, and Jianying Zhou. *Leakage-resilient client-side deduplication of encrypted data in cloud storage. Cryptology ePrint Archive, Report 2011/538*,2011. This scheme provides a security proof in a random oracle model for their solution, but this work does not address the problem of low min-entropy files.

Regarding encrypting data, convergent encryption is known as a cryptographic primitive, presented for example in two papers:
John R. Douceur, Atul Adya, William J. Bolosky, Dan Simon, and Marvin Theimer. *Reclaiming space from duplicate files in a serverless distributed file system. In Proceedings of the 22$^{nd}$ International Conference on Distributed Computing Systems (ICDCS'02), ICDCS '02*, starting from page 617, Washington, D.C., USA, 2002. IEEE Computer Society; and
Mark W. Storer, Kevin Greenan, Darrell D. E. Long, and Ethan L. Miller. *Secure data deduplication. In Proceedings of the 4th ACM international workshop on Storage security and survivability, StorageSS '08*, pages 1-10, New York, N.Y., USA, 2008. ACM.

Convergent encryption attempts to combine data confidentiality with the possibility of data deduplication. Convergent encryption of a message consists of encrypting the plaintext using a deterministic (symmetric) encryption scheme with a key which is deterministically derived solely from the plaintext. Clearly, when two users independently attempt to encrypt the same file, they will generate the same ciphertext which can be easily deduplicated. Unfortunately, convergent encryption does not provide semantic security as it is vulnerable to content-guessing attacks. Later, some known research formalized convergent encryption under the name message-locked encryption, as presented in the following paper: Mihir Bellare, Sriram Keelveedhi, and Thomas Ristenpart. *Message-locked encryption and secure deduplication. Cryptology ePrint Archive, Report 2012/631*, 2012. As expected, the security analysis presented in this work highlights that message-locked encryption offers confidentiality for unpredictable messages only, clearly failing to achieve semantic security.

In this context, there still is a need for an improved solution for performing remote data storage.

SUMMARY

In one embodiment, a computer-method implemented for performing remote data storage includes receiving, by at least one client, files to be stored on a remote server; evaluating popularity of the files; and storing the files on the server in a form that depends on the popularity of the files, files with a first level of popularity being stored in a deduplicated form and files with a second level of popularity being stored in an encrypted form, the first level of popularity being higher than the second level of popularity.

In another embodiment, a non-transitory computer readable storage medium has computer readable instructions stored thereon that, when implemented by a computer, implement a method for performing remote data storage. The method includes receiving, by at least one client, files to be stored on a remote server; evaluating popularity of the files; and storing the files on the server in a form that depends on the popularity of the files, files with a first level of popularity being stored in a deduplicated form and files with a second level of popularity being stored in an encrypted form, the first level of popularity being higher than the second level of popularity.

In another embodiment, a system includes at least one client, configured to receive files to be stored on a remote server, evaluate popularity of the files, and store the files on the server in a form that depends on the popularity of the files, files with a first level of popularity being stored in a deduplicated form and files with a second level of popularity being stored in an encrypted form, the first level of popularity being higher than the second level of popularity.

BRIEF DESCRIPTION OF THE SEVERAL VIEWS OF THE DRAWINGS

A system and a process embodying the invention will now be described, by way of non-limiting example, and in reference to the accompanying drawings, where.

DETAILED DESCRIPTION

Figure 1:
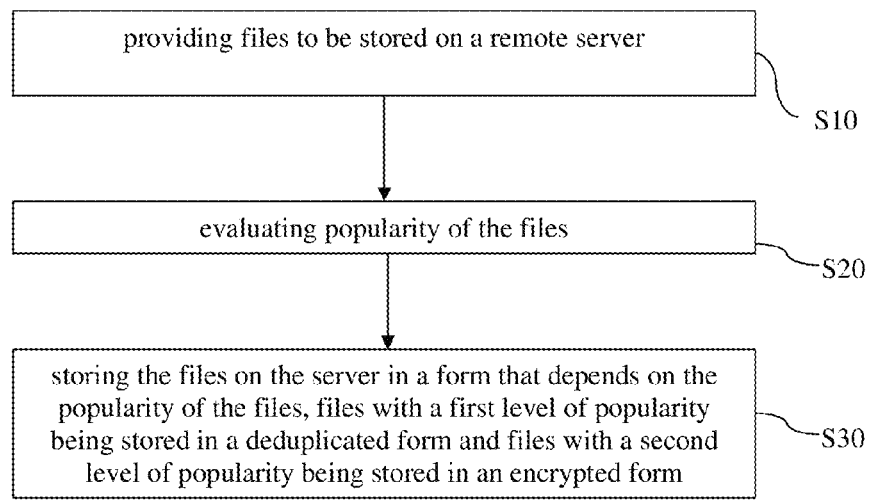
FIG. 1 shows a flowchart representing a method for performing remote data storage, in accordance with an exemplary embodiment.

According to one aspect, the invention is embodied as a computer-method implemented for performing remote data storage. The method comprises providing, by at least one client, files to be stored on a remote server. The method also comprises evaluating popularity of the files. The method then comprises storing the files on the server in a form that depends on the popularity of the files. In specific, given a first level of popularity higher than a second level of popularity, files with the first level of popularity are stored in a deduplicated form and files with the second level of popularity are stored in an encrypted form.

According to another aspect, the invention is embodied as a computer program comprising instructions for performing the method.

According to another aspect, the invention is embodied as a data storage medium having recorded thereon the computer program.

According to another aspect, the invention is embodied as a system comprising at least one client and a remote server, the system being adapted to perform the method.

In examples, the method may comprise one or more of the following: the providing includes repeatedly providing copies of the same file by different users, thereby increasing popularity of the file, and the method comprises storing the copies in a semantically secure encrypted form before the file reaches the first level of popularity, and in the deduplicated form after the file has reached the first level of popularity; the method comprises, upon the file reaching the first level of popularity, decrypting previously stored copies and performing deduplication on the copies; the semantically secure encrypted form results from applying, by a user, a threshold encryption system to data from which the file is derivable; the method further comprises, when storing a copy of the file in the semantically secure encrypted form, also storing the decryption share of the user; files reach the first level of popularity when a predetermined number of different users provide a copy of the file, the predetermined number being equal to the threshold of the threshold encryption system; storing a copy of the file in the semantically secure encrypted form comprises, by the user encrypting the file with a semantically secure encryption scheme, determining a random index, uploading at a location on the server associated to the random index, the result of encrypting the file with the semantically secure encryption scheme, applying the threshold encryption system to input data including the random index and data to invert the semantically secure encryption scheme, and uploading, on the server, the result of applying the threshold encryption system; storing a copy of the file in the semantically secure encrypted form further comprises, by the user, determining a file index ($idx_F$) uniquely associated to the file, the upload on the server of the result of applying the threshold encryption system being performed at a location associated to the file index; the file index is retrieved from an index map located apart from the server; and/or the files are provided in a convergent encrypted form.

Referring to the flowchart of FIG. 1, an exemplary computer-implemented method for performing remote data storage is illustrated. The method includes providing at block S10, by at least one client, files to be stored on a remote server. The method also includes evaluating at block S20 popularity of the files. The method then includes storing at block S30 the files on the server in a form that depends on the popularity of the files. More specifically, given a first level of popularity higher than a second level of popularity, files with the first level of popularity are stored in a deduplicated form and files with the second level of popularity are stored in an encrypted form.

Such a method improves remote data storage. Notably, by storing at S30 files in a deduplicated form, the method allows cost-effectiveness for the remote storage by saving space and/or bandwidth for such files. Also, by storing at S30 files in an encrypted form, the method allows high security for such files. Thanks to evaluating at S20 popularity of the files and storing the files at S30 under a form that depends on the popularity, the method allows a decision as to the storing of the file that is refined compared to the systematic solutions of the prior art. In particular, the method combines advantages of deduplication with advantages of encryption, while taking into account their potential incompatibility, so as to achieve a good tradeoff between the two kinds of advantages. As the feature of the files retained to decide on the storage form is their popularity, files with the first level of popularity being stored in a deduplicated form and files with the second level (lower that the first level) of popularity being stored in an encrypted form, the method smartly hints that more popular files are not intended to be confidential whereas less popular files are intended to be confidential, in the context of remote storage in computer science (e.g., cloud storage). The method thus adapts the storing according to this hint, which eventually achieves an efficient solution in the context of remote storage. The method thus allows space-saving at a least sacrifice of confidentiality.

Different aspects of the method are now discussed.

First of all, the method is for performing remote data storage. At S10, one or several clients provide several files (each client provides one or several files, resulting in at least two files at S10) that are to be eventually stored on a remote server. This means that the method is for storing on such a remote server files provided at such local client(s) connected to the server via a network, such as the Internet. The method may involve several users using several clients at S10, but it may also concern several users using only one client. Also, the remote server may be one of a network of several remote servers all providing memory for the remote data storage and being linked together, such a network being widely known as a "cloud". This is all known from cloud computing. In the following, it may be referred to "users" to designate actions performed by a client under a specific identification. It may also be referred to "storage provider" to designate the remote server(s), e.g., the cloud.

Figure 2:
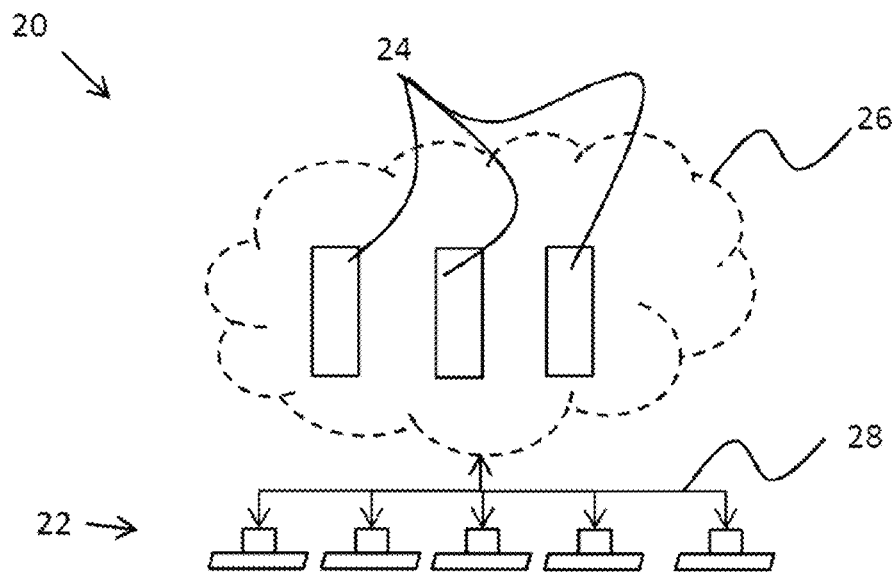
FIG. 2 shows a block diagram representing an example of a system for performing remote data storage, in accordance with an exemplary embodiment.

The method may be performed by a system adapted for that, and that comprises at least one client and a remote server. Such elements are widely known from the field of computer science. Indeed, the system may form a cloud system. As discussed later, the system may further comprise other entities that take part in the method, such as an identity provider and/or an indexing service. FIG. 2 shows an example of such a system. System 20 comprises clients 22 that are connected to servers 24, which form cloud 26, via network 28.

Clients and servers of the system communicate via specifically designed protocols, the protocols being implemented by specific computer programs installed on the client(s) and/or on the server(s) (and/or on the other entities should it be the case). Such computer programs comprise specific instructions for performing the method, by making the entities they are installed on interact in order to perform the method.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(a) (i.e., data storage medium(a)) having computer readable program code recorded thereon. Any combination of one or more computer readable medium(a) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium, i.e., data storage medium, may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the likes and conventional procedural programming languages, such as the "C" programming language or similar programming languages. The program code may be executed entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As known from the field of remote data storage, the providing S10 may be continuously performed by the client. At some point before the storing S30, the method evaluates S20 the popularity of a file that has been provided at an occurrence of S10. Of course, the evaluating S20 may occur each time a file is provided at S10, but this is not necessarily the case. Furthermore, the evaluating S20 may be performed by any entity. It may be the remote server, but it may also be a third party entity, such as an indexing service as discussed later. The evaluating may also be performed by the client itself, provided that it can receive relevant information for that.

The term "file" designates any structured piece of data (a structured datum). The popularity of a file is any measure of the extent to which the data of the file is spread among different users. The popularity of the file thus measures the extent to which the file is already known in the system. For example, the popularity of a file may be measured as a function of the number of different users providing the file at S10 for remote storage, for example the number itself, as used in the later discussed examples. For example, the popularity of a file can only increase through time. The popularity may be a continuous measure, or a discrete measure. In any case, the popularity may rank the files according to at least two levels: files with a first level of popularity, also designated as "popular" files in the following, and files with a second level of popularity that is (e.g., strictly) lower than the first level, also designated as "unpopular" files in the following. The popularity may directly rank the file, e.g., if it is binary (the popularity has two values, e.g., the values of the popularity of a file being "popular" or "unpopular"), or indirectly (a file becomes popular only after its popularity has reached a certain threshold). This is a matter of implementation.

Now, the method eventually stores at S30 the files on the server. As will be seen later through the examples, this storing of a file may actually be the result of different actions, possibly including previous storage(s) and modification(s) of the form of storing of the file, as will be discussed later. The method of FIG. 1 captures the fact that, at a point in time, all these actions being gathered under the label "storing S30", files are stored in a form that depends on their popularity, e.g., as it has last been evaluated. In other words, at each time the system is observed, files are stored in a form that depends on their current popularity. Indeed, the method is typically continuously performed by the system.

Storing a file on the server at S30 means storing data on the server that allow the retrieval of the file by any client having provided it at S10. Of course, for such retrieval, additional data may have to be stored elsewhere such as on the client or on any or several of the third entities mentioned earlier. However, most of the data (in terms of size) is stored on the server, such that the data used for the retrieval and stored on the client and the third entities is at least strictly smaller than the initial file size, for example less than 10% of the initial file size, and in any case smaller than the size of the data used for the retrieval and stored on the server. This is all known from remote data storage.

Now, as generally known from the field of remote data storage, files may be stored in different forms, or under different formats. The form in which a file is stored is the result of applying a different scheme to store the file. In the case of the storing S30, files with the first level of popularity are stored in a deduplicated form and files with the second level of popularity being stored in an encrypted form.

The deduplicated form is known from the field of data compression, notably in cloud computing, as already explained earlier referring to the prior art. As known, storage efficiency functions such as compression and deduplication afford storage providers a better utilization of their storage backends and the ability to serve more customers with the same infrastructure. Data deduplication is the process by which a storage provider only stores a single copy of a file that is owned by several of its users. There may be four different deduplication strategies, depending on whether deduplication happens at the client side (i.e., before the upload) or at the server side, and whether deduplication happens at a block level or at a file level. Deduplication is particularly rewarding when it is triggered at the client side, as it also saves upload bandwidth. For these reasons, deduplication is a critical enabler for a number of popular and successful storage services that offer cheap, remote storage to the broad public by performing client-side deduplication, thus saving both the network bandwidth and the storage costs associated with processing the same content multiple times. Indeed, data deduplication is arguably one of the main reasons why the prices for cloud storage and cloud backup services are dropping so sharply.

Research has shown that deduplication allows very appealing reductions in the usage of storage resources, as discussed in the following papers:

M. Dutch and L. Freeman. *Understanding data de-duplication ratios. SNIA forum,* 2008; and D. Harnik, O. Margalit, D. Naor, D. Sotnikov, and G. Vernik. *Estimation of deduplication ratios in large data sets. In Mass Storage Systems and Technologies (MSST),* 2012 *IEEE 28th Symposium* on, pages 1-11, April 2012.

In the case of the method, files with the first level of popularity are stored at S30 in the deduplicated form, meaning that files that are a copy of each other and are provided at S10 are stored only once on the server at S30, thereby achieving space efficiency. In the case of an implementation of a remote data storage method, this means that an essential part of the data for retrieval of a same file is commonly stored on the server (as one single file) for retrieval of all copies of the file by all clients having provided the file at S10. Some other files (with a value of popularity other than the first level, e.g., files with the second level of popularity) are on the contrary stored duplicated at S30, i.e., they are stored individually.

Moreover, in the case of the method, files with the second level of popularity are stored at S30 in an encrypted form. This means that such files are stored after their data have been processed by an encryption scheme. For example, the files are provided at S10 and then encrypted by the clients who locally store information to decrypt the files, and send the encrypted form to the server which stores it at S30.

Unfortunately, deduplication loses its effectiveness in conjunction with end-to-end encryption. End-to-end encryption in a storage system is the process by which data is encrypted at its source prior to ingress into the storage system, and is always only present as ciphertext within. End-to-end encryption is becoming an increasingly prominent requirement because of both the increasing number of security incidents linked to leakage of unencrypted data and the tightening of sector-specific laws and regulations. Also, some companies will be providing VM disk encryption in their hypervisors, making end-to-end encryption a strong reality in cloud systems. Clearly, if semantically secure encryption is used, file deduplication cannot take place, as no one—apart from the owner of the decryption key—can decide whether two ciphertexts correspond to the same plaintext file. Trivial solutions, such as forcing users to share encryption keys and/or using deterministic encryption, fall short of providing acceptable levels of security, since users can formulate guess-ciphertexts and use deduplication as an oracle that reveals whether some other user has uploaded the corresponding plaintext. As a consequence, storage systems are expected to undergo major restructuring to maintain the current disk/customer ratio in the presence of end-to-end encryption. The design of storage efficiency functions in general and of deduplication functions in particular that do not lose their effectiveness in presence of end-to-end security is therefore still an open problem.

In other words, encryption may be incompatible with deduplication, in the sense that deduplication does not achieve space or bandwidth efficiency when files are encrypted prior to their storing. This is the case for example for a semantically secure encryption. A semantically secure encryption is widely known as a kind of encryption that is independent of the encrypted data, e.g., non-convergent, such that performing the encryption by two different users leads to two different ciphertexts.

The method may thus result in having different types of encryption. Notably, the deduplicated form implies that certain levels of encryption are not feasible, e.g., if it has to be performed dynamically (i.e., a new user requesting upload of a copy of a file already deduplicated must be able to decrypt the data on the server if he is going not to upload data on the server, which notably implies that it cannot be a semantically secure encryption). The encryption level used for the files may thus decrease as the popularity increases. In specific, files with the second level of popularity may be encrypted with a higher level of security than files with the first level of popularity (which may be unencrypted, or for example convergent encrypted). Files with the second level of popularity in the method may be stored at S30 in the semantically secure encrypted form, implying that different ciphertexts are stored for different copies of the same file, whereas this is not the case for files with the first level of popularity, as the latter are deduplicated on the server. This allows to increase confidentiality for unpopular files, as they are encrypted, moreover in a way that does not allow an attacker of the server to infer on their content by noticing they are copies of each other (as the ciphertexts are different) or by attacks based on entropy.

Such a method thus achieves a good space and/or bandwidth saving, while keeping high confidentiality in relevant cases, such as to reduce the risks of known attacks whatever the form of the files (even in case of low entropy).

An example of the method is now discussed with reference to FIG. 3.

In this example, the method provides files repeatedly (i.e., continuously) by different users of at least one client. This corresponds to a real-time use of the system and the method. As a result, the providing includes repeatedly providing at block S100 copies of the same file by different users (possibly for different files). In this example, this increases popularity of the file (which measures the number of different users providing it). The method of the example comprises storing the copies in a semantically secure encrypted form at block S320 before the file reaches the first level of popularity, and in the deduplicated form at block S340, after the file has reached the first level of popularity. In this example, a file is whether at the second level of popularity (i.e., before reaching the first level), or at the first level (i.e., after it has reached the first level). Popularity thus ranks files in two categories. The method of the example ensures that unpopular files are securely stored, whereas deduplication advantages are reached for popular files.

Figure 3:
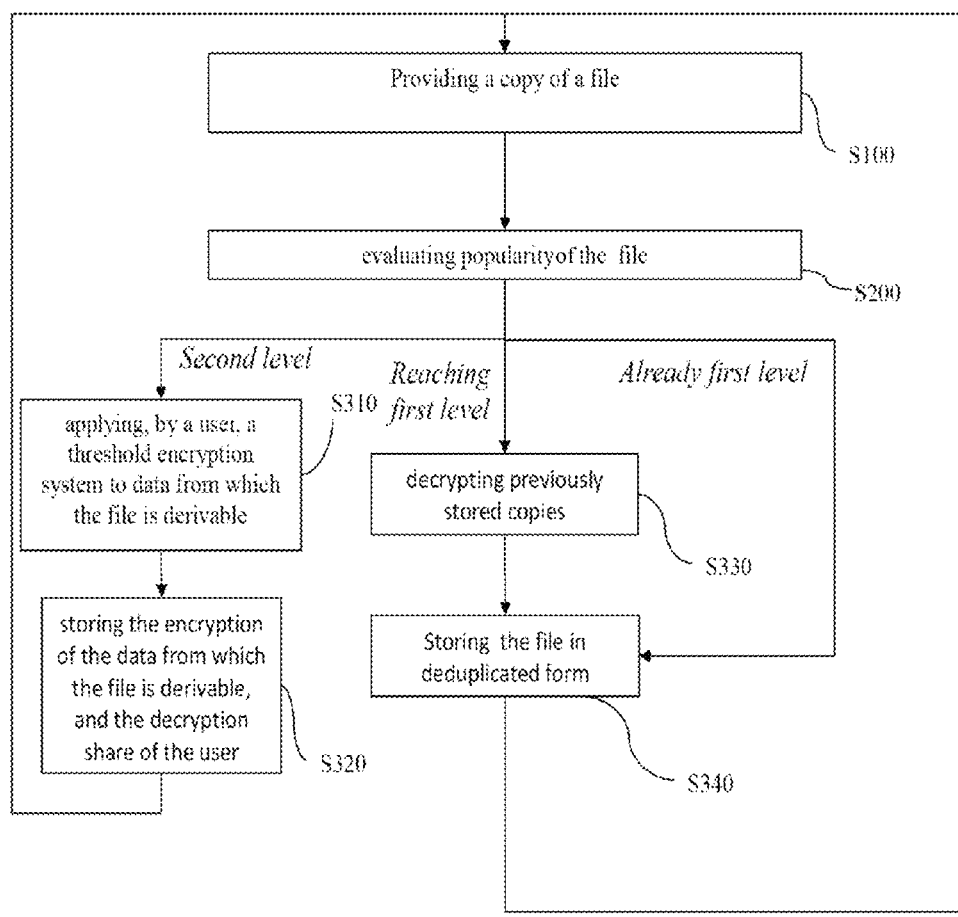
FIG. 3 shows a flowchart representing an example of the method of FIG. 1.

Referring to FIG. 3, the semantically secure encrypted form results from applying at block S310, by a user (i.e., the user providing the file at the current repetition of S100), a threshold encryption system to data from which the file is derivable. This way, the server never learns the contents of the data before deduplication, thereby increasing security. Rather, the clients have control on when the deduplication takes place.

A "threshold encryption system" is a scheme which encrypts data in a semantically securely way, the decryption of the ciphertext necessitating the participation of a predetermined number of descriptors (the predetermined number being called the "threshold" of the encryption system). The participating descriptors all have a share of a private key used by the threshold encryption system, and they may thus output respective decryption shares. A number of decryption shares equal to the threshold allows decryption of an encryption of the data from which the file is derivable (this functionally defines "decryption shares"). These concepts are known from the field of cryptography, and how they may be applied in the context of the method will be discussed later through a more specific example.

The expression "data from which the file is derivable" here designates the fact that, when storing the file on the server, the threshold encryption system is not necessarily applied directly to the whole data forming the file. Rather, it may be applied to other data that relate to the data forming the file, in such a way that a user being in possession of this data may retrieve the file. As discussed later, the threshold encryption system may for example be applied to random indexes and user keys utilized to store a version of the file encrypted with a user key and uploaded at the random index on the server.

The method of the example further comprises, when storing a copy of the file in the semantically secure encrypted form, also storing the decryption share of the user, all at block S320 on FIG. 3. This allows the method not to require interaction with the users when decryption at block S330 (discussed later) has to be performed in order to perform deduplication. The process is thus fast and the transition is seamless.

Upon the file reaching the first level of popularity, the method includes decrypting at block S330 previously stored copies. In the example, files reach the first level of popularity when a predetermined number of different users (called $p_{lim}$ in the later discussed detailed example) provide a copy of the file, the predetermined number being equal to the threshold of the threshold encryption system. This is indeed possible as a number of decryption shares equal to the threshold are available, which, by definition of a threshold encryption system, allows decryption.

The method then includes performing deduplication at block S340 on the copies. This means that space used by all copies is reclaimed, and only one copy is stored in a deduplicated form. All users of the file may then access the file by accessing the single storage its data. In other words, "performing deduplication" means erasing all copies but one and providing means to users that are owners of the file to access it. As will be discussed, the method may for that comprise placing the plaintext (i.e., the data of the file as such) or convergently encrypted text (i.e., an encrypted form the file, that is the same applied by all users, as the key used is derived from the file) at a location on the server retrievable by all the owners. Alternatively, if the file provided at block S100 is already popular, the method may directly store it in the deduplicated form (S340), simply by providing the address of the previously stored data to the new owner of the file.

Such a method constitutes an encryption scheme that guarantees semantic security for unpopular data and provides weaker security and better storage and bandwidth benefits for popular data. This way, data deduplication can be effective for popular data, whilst semantically secure encryption protects unpopular content, preventing its deduplication. Transitions from one mode to the other take place seamlessly at the storage server side if and only if a file becomes popular. As shown later, the method is secure under the Symmetric External Decisional Diffie-Hellman Assumption in the random oracle model. Performance of the method is also evaluated later with benchmarks and simulations.

The method makes efficient use of deduplication: data deduplication ensures that multiple uploads for the same content only consume the network bandwidth and the storage space for a single upload. Deduplication is actively used by a number of cloud backup providers (e.g., Bitcasa, trademark registered) as well as various cloud services (e.g., Dropbox, trademark registered). It is arguably one of the main reasons why prices for cloud storage have dropped so sharply. Unfortunately, encrypted data is pseudorandom and thus cannot be deduplicated: as a consequence, prior art schemes have to entirely sacrifice either security or storage efficiency.

The method however permits a more fine-grained trade-off. The intuition behind the solution is that outsourced data may require different degrees of protection, depending on how popular it is: content that is shared by many users, such as a popular song, movie or install package, arguably requires less protection than a personal document, the copy of a payslip or the draft of an unsubmitted scientific paper.

A detailed example of the method is now discussed.

In this example, storing a copy of the file in the semantically secure encrypted form comprises, by the user, encrypting the file with a semantically secure encryption scheme. Typically, the user may use a private key and encrypt the file with any known semantically secure technique. Then, the user may determine a random index and upload at a location on the server associated to the random index, the result of encrypting the file with the semantically secure encryption scheme. This way, retrieval of the file is harder for attackers. Then the user may apply the threshold encryption system to input data (i.e., the "data from which the file is derivable" mentioned earlier) including the random index and data to invert the semantically secure encryption scheme (e.g., a private key used by the user to apply the semantically secure scheme). Finally, the user may upload, on the server, the result of applying the threshold encryption system. The user may then retrieve the file by keeping locally data to invert the threshold encryption system (e.g., the whole private key used in the threshold encryption system). This way, the user may download the threshold encrypted input data. The user may then decrypt it to retrieve the random index and the data to invert the semantically secure encryption scheme. Thanks to the random index, the user may retrieve the semantically secure encrypted file, and thanks to the data to invert it, the user may decrypt it and retrieve the file.

In the example, storing a copy of the file in the semantically secure encrypted form further comprises, by the user, determining a file index uniquely associated to the file. The upload on the server of the result of applying the threshold encryption system is then performed at a location associated to the file index. This allows the data from which the file is derivable to be gathered/linked for all copies of the file, so that decryption may occur easily upon the file reaching the first level of popularity. The unique index is any known way to gather/associate such data, and examples are provided later.

In the example, the file index is retrieved from an index map located apart from the server, for example in another entity as described later. An index map is merely a way to associate an index to a file. This allows dissociating such sensitive data from the server, and further increases security by preventing attacks.

Also, in the example, the files are provided by users in a convergent encrypted form. In other words, both files with the first level of popularity and files with the second level of popularity are provided encrypted, with a convergent encryption scheme. This creates a further layer of protection of the files, while ensuring that deduplication of popular files is not affected in terms of space-saving ratio, as convergent encryption ensures that copies of the same file result in the same ciphertexts after encryption.

The following discussion of this example brings the following contributions:
- it presents $\epsilon_\mu$, a novel threshold cryptosystem (which can be of independent interest), together with a security model and formal security proofs; and
- it introduces a scheme that uses $\epsilon_\mu$ as a building block and enables to leverage popularity as a means to achieve both security and storage efficiency and discuss its overall security.

After presenting the method of the example, evaluation of its performance is made (both of its computational overhead using a real implementation, and of its ability to reduce storage-space using a simulation, demonstrating the practicality of the scheme).

An overview of the example is now provided.

The main intuition behind the method is that, in a deduplicated storage system, data may require different degrees of protection that depend on how popular a datum is. Let us start with an example: imagine that a storage system is used by multiple users to perform full backups of their hard drives. The files that undergo backup can be divided into those uploaded by many users and those uploaded by one or very few users only. Files falling in the former category (e.g., system binaries) will benefit strongly from deduplication because of their popularity and may not be particularly sensitive from a confidentiality standpoint. Files falling in the latter category, on the other hand, may contain user-generated content which requires confidentiality, and would by definition not allow a lot of space to be reclaimed through deduplication. The same reasoning can be applied to the common blocks of a VM image used by multiple VMs that adopt a copy-on-write sharing approach, to mail attachments sent to a large number of recipient, to reused code snippets, etc.

Figure 4:
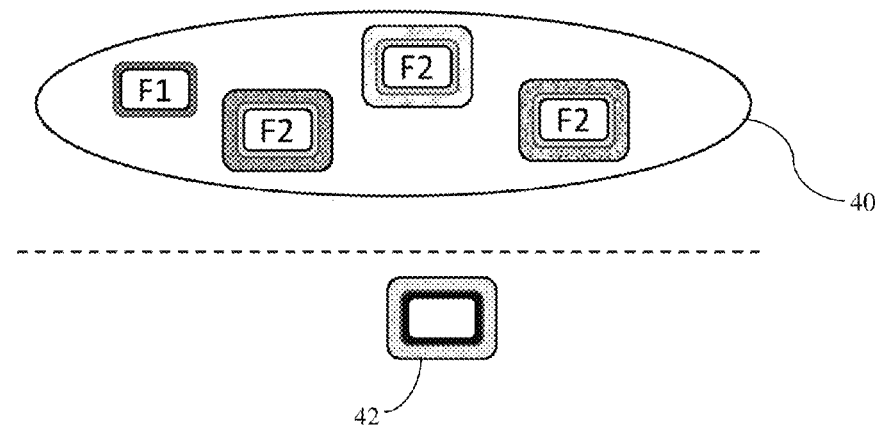
FIG. 4 and FIG. 5 illustrate discussions on examples of the method.

This intuition can be implemented cryptographically using a multi-layered cryptosystem. All files are initially declared unpopular and are encrypted with two layers, as illustrated in FIG. 4, which illustrates the multi-layered cryptosystem used in the method of the discussed example. Unpopular files F2 are protected using two layers 42, whereas for popular files F1, the outer layer 42 can be removed. The inner layer 42 is obtained through convergent encryption that generates identical ciphertext at each invocation. The outer layer (for unpopular files) is obtained through a semantically secure cryptosystem. The inner layer is applied in the example using a convergent cryptosystem, whereas the outer layer is applied using a semantically secure threshold cryptosystem. Uploaders of an unpopular file attach a decryption share to the ciphertext. In this way, when sufficient distinct copies of an unpopular file have been uploaded, the threshold layer can be removed. This step has two consequences: (i) the security notion for the now popular file is downgraded from semantic to standard convergent (see the paper of Bellare et al. discussed earlier), and (ii) the properties of the remaining convergent encryption layer allow deduplication to happen naturally. It is easy to see that security is traded for storage efficiency as for every file that transits from unpopular to popular status, storage space can be reclaimed.

There are two further challenges in the secure design of the scheme. First of all, if no proper identity management is in place, sybil attacks (such as described in the paper John R Douceur. *The sybil attack. In Peer-to-peer Systems*, pages 251-260. Springer, 2002.) could be mounted by spawning sufficient sybil accounts to force a file to become popular: in this way, the semantically secure encryption layer could be forced off and more information could be inferred on the content of the file, whose only remaining protection is the weaker convergent layer. While this is acceptable for popular files (provided of course that storage efficiency is an objective), it is not for unpopular files whose content—the inventors postulate—has to enjoy stronger protection. The second issue relates to the need of every deduplicating system to group together uploads of the same content. In client-side deduplicating systems, this is usually accomplished through an index computed deterministically from the content of the file so that all uploading users can compute the same. However, by its very nature, this index leaks information about the content of the file and violates semantic security for unpopular files.

For the reasons listed above, the method of the discussed example extends the conventional user-storage provider setting with two additional trusted entities: (i) an identity provider, that deploys a strict user identity control and prevents users from mounting sybil attacks, and (ii) an indexing service that provides a secure indirection for unpopular files.

Figure 5:
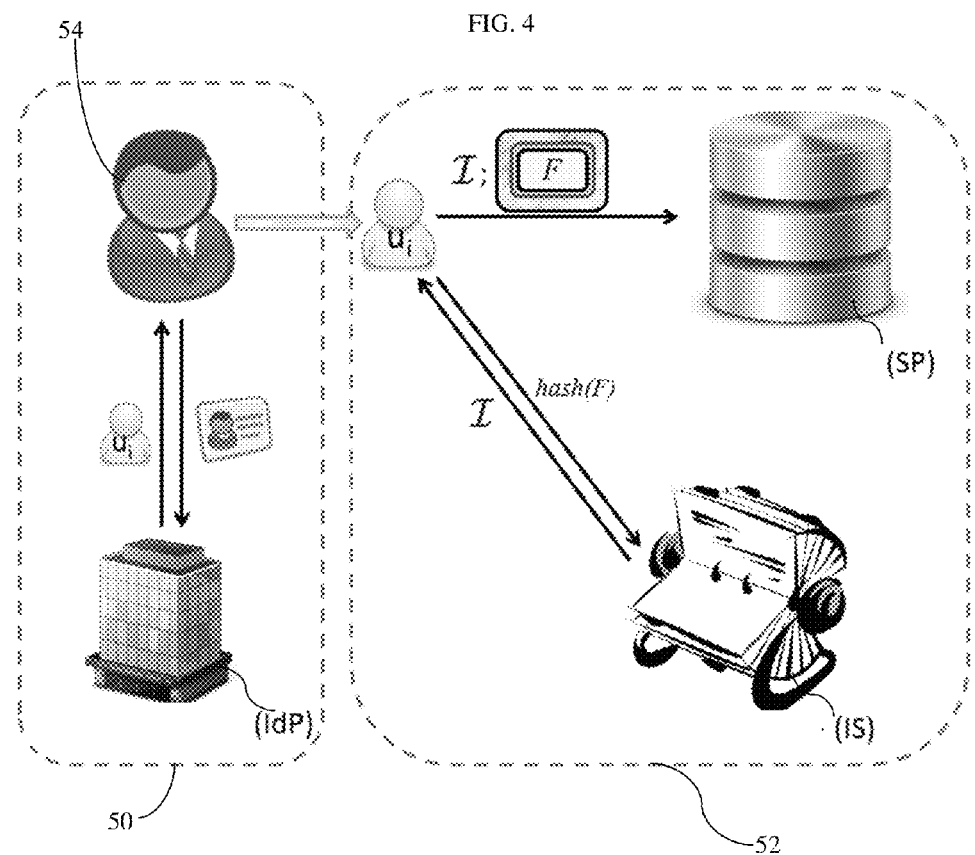

The contemplated system for this example consists of users 54 that obtain IDs $u_i$, a storage provider SP and two trusted entities, the identity provider IdP, and the indexing service IS, as shown in FIG. 5, which also illustrates the interaction between the entities of the system. Users 54 perform registration 50 with identity provider IdP, and file upload 52 with storage provider SP and indexing service IS.

The storage provider (S) offers basic storage services and can be instantiated by any known storage provider (e.g., Bitcasa, Flu, registered trademarks). Users ($U_i$) own files and wish to make use of the storage provider to ensure persistent storage of their content. Users are identified via credentials issued by an identity provider IdP when a user first joins the system.

A file is identified within S via a unique file identifier ( ) which is issued by the indexing service IS when the file is uploaded to S. The indexing service also maintains a record of how many distinct users have uploaded a file.

The objective of the method of the example is confidentiality of user content. Specifically, the method achieves two different security notions, depending on the nature of each datum, as follows:

Semantic security for unpopular data (as defined e.g., in the paper Shafi Goldwasser and Silvio Micali. *Probabilistic encryption. J. Comput. Syst. Sci.*, 1984); and Conventional convergent security for popular data (as defined in the paper of Bellare et al. discussed earlier).

It is noted that integrity and data origin authentication exceed the scope of this discussion, as they can be handled in any known way.

In the method, the storage provider is trusted to reliably store data on behalf of users and make it available to any user upon request. Nevertheless, S is interested in compromising the confidentiality of user content. We assume that the storage provider controls $n_A$ users: this captures the two scenarios of a set of malicious users colluding with the storage provider and the storage provider attempting to spawn system users. We also assume that the goal of a malicious user is only limited to breaking the confidentiality of content uploaded by honest users.

Let us now formally define popularity as used in this example of the method. We introduce a system-wide popularity limit, $p_{lim}$, which represents the smallest number of distinct, legitimate users that need to upload a given file F for that file to be declared popular. Note that $p_{lim}$ does not account for malicious uploads. Based on $p_{lim}$ and $n_A$, we can then introduce the threshold t for our system, which is set to be $t \geq p_{lim} + n_A$. Setting the global system threshold to t ensures that the adversary cannot use its control over $n_A$ users to subvert the popularity mechanism and force a non-popular file of its choice to become popular. A file shall therefore be declared popular once more than t uploads for it have taken place. Note that this accounts for $n_A$ possibly malicious uploads.

The indexing service and the identity provider are assumed to be completely trusted and to abide by the protocol specifications. In particular, it is assumed that these entities will not collude with the adversary, and that the adversary cannot compromise them. We also assume that communication between these entities and the user is properly secured using any known secure communication protocol (e.g., TLS/SSL).

The building blocks for the method are now described.

First, we shall describe the interactions between a storage provider (S) that uses deduplication and a set of users (U) who store content on the server. We consider client-side deduplication, i.e., the form of deduplication that "happens" at the client side, thus avoiding the need to upload the file and saving network bandwidth. For simplicity, we assume that deduplication happens at the file level. To identify files and detect duplicates, the scheme uses an indexing function I:{0, 1}* → {0,1}*; we will refer to $I_F$ as the index for a given file F. The storage provider's backend can be modeled as an associative array DB mapping indexes produced by I to records of arbitrary length: for example $DB[I_F]$ is the record mapped to the index of file F. In a simple deduplication scheme, records contain two fields, $DB[I_F]$.data and $DB[I_F]$.users. The first contains the content of file F, whereas the second is a list that tracks the users that have so far uploaded F. The storage provider and users interact using the following algorithms:

Put: user u sends $I_F$ to S. The latter checks whether $DB[I_F]$ exists. If it does, the server appends u to $DB[I_F]$.users. Otherwise, it requests u to upload the content of F, which will be assigned to $DB[I_F]$.data. $DB[I_F]$.users is initialized with u.

Get: user u sends $I_F$ to the server. The server checks whether $DB[I_F]$ exists and whether $DB[I_F]$.users contains u. If it does, the server responds with $DB[I_F]$.data. Otherwise, it answers with an error message.

Symmetric Cryptosystems and Convergent Encryption are now discussed.

A symmetric cryptosystem $\epsilon$ is defined as a tuple (K, E, D) of probabilistic polynomial-time algorithms (assuming a security parameter κ). K takes κ as input and is used to generate a random secret key k, which is then used by E to encrypt a message m and generate a ciphertext c, and by D to decrypt the ciphertext and produce the original message.

A convergent encryption scheme $\epsilon_c$, also known as message-locked encryption scheme, is defined as a tuple of three polynomial-time algorithms (assuming a security parameter κ) (K, E, D). The two main differences with respect to $\epsilon$ is that i) these algorithms are not probabilistic and ii) that keys generated by K are a deterministic function of the cleartext message m; we then refer to keys generated by $\epsilon_c$.K as $k_m$. As a consequence of the deterministic nature of these algorithms, multiple invocations of K and E (on input of a given message m) produce identical keys and ciphertexts, respectively, as output.

Threshold Cryptosystems are now discussed.

Threshold cryptosystems offer the ability to share the power of performing certain cryptographic operations (e.g., generating a signature, decrypting a message, computing a shared secret) among n authorized users, such that any t of them can do it efficiently. Moreover, according to the security properties of threshold cryptosystems it is computationally infeasible to perform these operations with fewer than t (authorized) users. In our scheme we use threshold public-key cryptosystem. A threshold public-key cryptosystems $\epsilon_t$ is defined as a tuple (Setup, Encrypt, DShare, Decrypt), consisting of four probabilistic polynomial-time algorithms (in terms of a security parameter κ) with the following properties:

Setup(κ,n,t)→(pk, $sk_1$, ... $sk_n$): generates the public key of the system pk and n shares $sk_i$ of the private key, which are secretly provided to the authorized users.

Encrypt (pk,m)→(c): takes as input a message m and produces its encrypted version c under the public key pk.

DShare($sk_i$,m)→($ds_i$): takes as input a message m and a key share $sk_i$ and produces a decryption share $ds_i$.

Decrypt(c,$ds_1$, ..., $ds_t$)→(m): takes as input a ciphertext c and a set of t decryption shares and outputs the cleartext message m.

The scheme of the method of the example is now formally introduced. First, a novel cryptosystem is presented whose threshold and convergent nature make it a suitable building block for the scheme. Then the role of the trusted third parties is described and finally the algorithms that compose the scheme are detailed.

We now discuss $\epsilon_\mu$: a Convergent Threshold Cryptosystem.

It is provided a formal description of a contribution of the method, namely $\epsilon_\mu$, a novel threshold cryptosystem, that constitutes a building block in the implementation of the scheme. Nonetheless, this also constitutes a contribution of independent interest which can be applied in other scenarios.

In the remainder of this discussion it is made use of pairing groups $G_1$, g, $G_2$, $\bar{g}$, $G_T$, ê, where $G_1 = \langle g \rangle$, $G_2 = \langle \bar{g} \rangle$) are of prime order q, where the bitsize of q is determined by the security parameter κ, and ê: $G_1 \times G_2 \to G_T$ is a computable, non-degenerate bilinear pairing. We further assume that there is no efficient distortion map $\psi: G_1 \to G_2$, or $\psi: G_2 \to G_1$. These groups are commonly referred to as SXDH groups, i.e., groups where it is known that the Symmetric Extensible Diffie Hellman Assumption holds (such as described in the paper Giuseppe Ateniese, Marina Blanton, and Jonathan Kirsch. *Secret handshakes with dynamic and fuzzy matching. In Network and Distributed System Security Symposuim. The Internet Society,* 2007). Security of $\epsilon_\mu$ is based on this assumption (as later discussed).

$\epsilon_\mu$ is defined as a tuple (Setup, Encrypt, DShare, Decrypt), consisting of four probabilistic polynomial-time algorithms (in terms of a security parameter $\kappa$) implemented as follows:

Setup($\kappa$,n,t)$\to$(pk, $sk_1$, $sk_n$): at first, q, $G_1$, g, $G_2$, $\bar{g}$, $G_T$ and ê are generated as described above. Also, let x be a random element of $Z_q^*$ and $\{x_i\}_{i=0}^n$ be shares of x such that any set of t shares can be used to reconstruct x through polynomial interpolation (see [21] for more details). Also, let $\bar{g}_{pub} \leftarrow \bar{g}^x$. Finally, let $H_1: \{0,1\}^* \to G_1$ and $H_2: G_T \to \{0,1\}^l$ for some l, be two cryptographic hash functions. Then, the public key pk is set to be {q, $G_1$, $G_2$, $G_T$, ê, $H_1$, $H_2$, g, $\bar{g}$, $\bar{g}_{pub}$} and the i-th decryption share $sk_i$ to be $x_i$.

Encrypt (pk, m)$\to$(c): let r be chosen randomly from $Z_q^*$ and let $E \leftarrow \hat{e}(H_1(m), \bar{g}_{pub})^r$. Next, set $c_1 \to H_2(E) \oplus m$ and $c_2 \leftarrow \bar{g}^r$. Finally, output the ciphertext c as $c \leftarrow (c_1, c_2)$.

DShare($sk_i$, m)$\to$($ds_i$): let $ds_i \leftarrow H_1(m)^{sk_i}$.

Decrypt(c, $ds_1, \ldots, ds_t$)$\to$(m): first parse c as $(c_1, c_2)$; then compute $$\prod_{ds_i \in S} ds_i^{\lambda_{0,i}^S} = H_1(m)^{\sum_{i \in S} x_i \lambda_{0,i}^S} = H_1(m)^x,$$

where S is the set of decryption shares $\{ds_1, \ldots, ds_t\}$ and $\lambda_{0,i}^S$ are Lagrangian coefficients for the given set S. Then compute $\hat{E}$ as $\hat{e}(H_1(m)^x, c_2)$ and output $c_1 \oplus H_2(\hat{E})$.

Note that decryption is possible because, by the properties of bilinear pairings $$\hat{e}(H_1(m)^x, \bar{g}^r) = \hat{e}(H_1(m), \bar{g}_{pub})^r = \hat{e}(H_1(m), \bar{g}^x)^r$$

The above equality satisfies considerations on the correctness of $\epsilon_\mu$. later it is also proven that $\epsilon_\mu$ is a semantically secure cryptosystem.

$\epsilon_\mu$ has a few interesting properties that are instrumental to achieving a secure and efficient implementation of the scheme:

The decryption algorithm is non-interactive, meaning that it does not require the live participation of the entities that executed the $\epsilon_\mu$.DShare algorithm.

It mimics convergent encryption in that the decryption shares are deterministically dependent on the plaintext message; however, in contrast to plain convergent encryption, the cryptosystem provides semantic security as long as fewer than t decryption shares are collected.

The cryptosystem can be reused for an arbitrary number of messages, i.e., the $\epsilon_\mu$. Setup algorithm should only be executed once.

The role of Trusted Third Parties is now discussed.

The scheme uses two trusted components, namely, an identity provider (IdP) and an indexing service (IS). The main role of the IdP is to thwart sybil attacks by ensuring that users can sign in only once: we treat this as an orthogonal problem for which many effective solutions have been outlined (see the paper John R Douceur. *The sybil attack. In Peer-to-peer Systems,* pages 251-260. Springer, 2002). The identity provider is also responsible for the execution of $\epsilon_\mu$. Setup and for the distribution of the public key and a share of the private key to each user of the system. Execution of $\epsilon_\mu$. Setup grants the identity provider knowledge of the private key of the system: we assume the IdP to be trusted not to leak it and not to use this knowledge to violate confidentiality of unpopular data. The assumption is a legitimate one as today's identity providers are entrusted by their users to comply with similar rules.

The main role of the second trusted third party, i.e., the indexing service, is to avoid leaking information about unpopular files to the storage provider through the index used to coalesce multiple uploads of the same file coming from different users (see earlier discussion), without which reclaiming space and saving network bandwidth through deduplication would be infeasible. The leakage is related to the requirement of finding a common indexing function that can be evaluated independently by different users whose only shared piece of information is the content of the file itself. As a result, the indexing function is usually a deterministic (albeit, often one-way) function of the file's content, which is leaked to the cloud provider. We introduce the indexing service to tackle this problem before deduplication takes place, i.e., when the file is still unpopular.

Recall from earlier discussion that the indexing function I produces indexes $I_F$ for every file F. This function can be implemented using cryptographic hash functions, but we avoid the usual notation with H to prevent it from being confused with the other hash functions used in $\epsilon_\mu$. Informally, the indexing service receives requests from users about $I_F$ and keeps count of the number of requests received for it from different users. As long as this number is below the popularity threshold, IS answers with a bitstring of the same length as the output of I; this bitstring is obtained by invoking a PRF (with a random seed $\sigma$) on a concatenation of $I_F$ and the identity of the requesting user. The domain of I and of the PRF is large enough to ensure that collisions happen with negligible probability. IS also keeps track of all such indexes. Whenever the popularity threshold is reached for a given file F, the indexing service reveals the set of indexes that were generated for it. More formally, the IS maintains an associative array $DB_{IS}[I_F]$ with two fields, $DB_{IS}[I_F]$.ctr and $DB_{IS}[I_F]$.idxes. The first is a counter initialized to zero, the second is an initially empty list. IS implements the GetIdx algorithm, with pseudo-code below:

```
U_i :                  I_F ← I(F)
U_i → IS :             I_F
IS :                   I ← ∅
                       if ( DB_IS [I_F].ctr > t )
                           return I_F , I
                       I_rnd ← PRF_σ(U_i ‖ I_F )
                       if (I_rnd ∉ DB_IS [I_F].idxes )
                           increment DB_IS [I_F].ctr
                           add I_rnd to DB_IS [I_F].idxes
                       if ( DB_IS [I_F].ctr = t )
                           I ← DB_IS [I_F].idxes
                       return I_rnd , I
```

An important consequence of the choice of how $I_{rnd}$ is computed is that repeated queries by the same user on the same target file will neither shift a given file's popularity nor reveal anything but a single index.

The scheme is now formally introduced, detailing the interactions between a set of users $\{U_i\}_{i=0}^n$, a storage provider S and the two trusted entities, the identity provider IdP and the indexing service IS. S is modelled as described earlier; the database record contains an extra Boolean field, $DB[I_F]$.popular, initialized to false for every new record.

Recall that $\epsilon$ and $\epsilon_\mu$ are a symmetric cryptosystem and a convergent symmetric cryptosystem, respectively; $\epsilon_\mu$ is our convergent threshold cryptosystem. The scheme consists of the following distributed algorithms:

Init: IdP executes $\epsilon_\mu$.Setup, publishes the public key system pk of the system.

IdP keeps key shares $\{sk_i\}_{i=1}^{i=n}$ secret.

Join: whenever a user $U_i$ wants to join the system, she contacts IdP. IdP verifies $U_S$'s identity; upon successful verification, it issues the credentials $U_i$ will need to authenticate to S and a secret key share $sk_i$.

Upload: this algorithm describes the interactions taking place between a user $U_i$, the storage server S and the indexing service IS whenever $U_i$ requests upload of a file F. At first, $U_i$ uses convergent encryption to create ciphertext $F_c$; $U_i$ then interacts with IS to obtain an index $I_{ret}$ to use for the interaction with S and a (possibly empty) list of indexes used by other users when uploading the same file. Based on what IS returns, $U_i$ proceeds with the execution of different sub-algorithms, with detailed pseudo-code below:

```
U_i:           K_c ← E_c.E(F);        F_c ← E_c.E(K_c, F)
               |_{F_c} ← I(F_c)
U_i → IS :     |_{F_c}
U_i ← IS :     ⟨I, |_{ret}⟩ ← GetIdx(|_{F_c})
U_i:           if(|_{ret} = |_{F_c}) execute Upload.Unpopular
               else if( I = ∅ ) execute Upload.Unpopular
               else
                   execute Upload.Unpopular
                   execute Upload.Reclaim
```

Upload.Unpopular: this algorithm captures the interaction between $U_i$ and S if F is not (yet) popular. In this case, $I_{ret}$ is a random index. The user uploads a blob containing two ciphertexts, obtained with $\epsilon$ and $\epsilon_\mu$, respectively. The first ciphertext allows $U_i$ to retrieve and decrypt the file if it never becomes popular. The second gives S the ability to remove the threshold encryption layer and perform deduplication if the file becomes popular. Alternatively, if one would adopt a solution in which the file is encrypted only once with K; this key—and not the entire file—is in turn encrypted with a slightly modified version of $\epsilon_\mu$ that allows $H_1(F_c)$ to be used as the $H_1$-hash for computing ciphertext and decryption shares for K. This approach would require uploading and storing a single encrypted copy of the file and not two as described above. $U_i$ deletes F, replacing it with a stub containing the two indexes, $I_{ret}$, $I_{F_c}$, and the two keys K and $K_c$.

Pseudo code for the Upload.Unpopular algorithm is provided below:

```
U_i:           K ← ε.K ( );      c ← ε.E(K, F)
               c_μ ← ε_μ.Encrypt (pk, F_c)
               ds_i ← ε_μ.DShare(sk_i, F_c)
               F' ← ⟨c, c_μ, ds_i⟩
U_i → S :      |_{ret}, F'
S :            if(¬ DB[|_{ret}].popular) execute Put(|_{F_c}, U_i, F')
               else signal an error and exit
U_i:           F ← ⟨K, K_c, |_{ret}, |_{F_c}⟩
```

Upload.Reclaim: this algorithm is executed exactly once for every popular file whenever $U_i$'s upload of F reaches the popularity threshold. The user sends to S the list of indexes I received from IS. S collects the decryption shares from each uploaded blob. It is then able to decrypt each uploaded instance of $c_\mu$ and can trigger the execution of Put, to store the outcome of the decryption as $DB\lfloor I_{F_c}\rfloor$.data. Note that, because of the nature of convergent encryption, all decrypted instances are identical, hence deduplication happens automatically. S could perform an additional check and raise an error if not all decryptions of $c_\mu$ are pairwise identical. Finally, S can remove all previously uploaded record entries, thus effectively reclaiming the space that was previously used.

Pseudo code for the Upload.Reclaim algorithm is provided below:

```
U_i → S :      I
S :            DS ← {ds :⟨c, c_μ, ds⟩ ← DB[| ].data, | ∈ I}
               for each(|_i ∈ I )
                   parse DB[|_F].data as⟨c, c_μ, ds⟩
                   F_c ← ε_μ.Decrypt(c_μ, DS)
                   |_{F_c} ← I(F_c)
                   U_i ← DB[|_i].users
                   execute Put(|_{F_c}, U_i, F_c)
               DB[|_{F_c}].popular ← true
               delete all records indexed by I
```

Upload.Popular: this algorithm captures the interaction between $U_i$ and S if F is already popular; note that in this case, $I_{ret}=I_{F_c}$. In this case, the user is not expected to upload the content of the file as it has already been declared popular. $U_i$ deletes F, replacing it with a stub containing the index $I_{F_c}$ and of the key $K_c$.

Pseudo code for the Upload.Popular algorithm is provided below:

```
U_i → S :      |_{F_c}
S :            if( DB[|_{F_c}].popular ) execute Put(|_{F_c}, U_i)
               else signal an error and exit
U_i:           F ← ⟨K_c, |_{F_c}⟩
```

Dowload: whenever user $U_i$ wants to retrieve a previously uploaded file, it reads the tuple used to replace the content of F during the execution of the Upload algorithm. It first attempts to issue a Get request on S, supplying $I_{ret}$ as index. If the operation succeeds, it proceeds to decrypt the received content with $\epsilon$.D, using key K, and returns the output of the decryption. Otherwise, it issues a second Get request, supplying $I_{F_c}$ as index; then it invokes $\epsilon_c$.D on the received content, using $K_c$ as decryption key, and outputs the decrypted plaintext.

It is noted that the inventors have analyzed the security of the $\epsilon_\mu$ cryptosystem and shown that the security requirements are met by the scheme of the example as a whole.

Additionally, the inventors have evaluated the performance of the scheme with respect to the computation overhead at file encryption and decryption time, and with respect to storage optimization. They have compared the performance of the scheme with the performance of other systems that preserve data confidentiality. Overall, they have concluded that the overhead introduced by the threshold cryptosystem $\epsilon_\mu$ is relatively small compared to the resource consumption of symmetric and convergent encryption operations. However, as the scheme at experiment combines both symmetric encryption and convergent encryption, the time needed for the encryption and decryption operations on an unpopular file is approximately the same as the sum of the time required for each of these operations when performed individually.

Additionally, the inventors have analyzed, using a simulation, the ability of the scheme to reclaim space through deduplication. They have observed that if the popularity of files fits Pareto distribution, then the space savings compared with savings of classic deduplication are only slightly worse, yet still quite good for any practical choice of the t value. If the popularity fits Uniform or Exponential distribution, the savings highly depend on the chosen value of t.

The invention claimed is:
1. A computer-implemented method for performing remote data storage, the method comprising:
   receiving, by at least one client, files to be stored on a remote server;
   evaluating popularity of the files;
   storing the files on the server in a form that depends on the popularity of the files, files with a first level of popularity being stored in a deduplicated form and files with a second level of popularity being stored in an encrypted form, the first level of popularity being higher than the second level of popularity; and
   wherein the receiving includes repeatedly receiving copies of the same file by different users, thereby increasing popularity of the file, and wherein the method further comprises storing the copies in a semantically secure encrypted form before the file reaches the first level of popularity, and in the deduplicated form after the file has reached the first level of popularity.
2. The method of claim 1, further comprising, upon the file reaching the first level of popularity, decrypting previously stored copies in the semantically secure encrypted form and performing deduplication on the decrypted copies.
3. The method of claim 2, wherein the semantically secure encrypted form results from application, by a user, of a threshold encryption system to data from which the file is derivable, wherein the threshold encryption system uses a threshold to determine when the file in the semantically secure encrypted form can be decrypted.
4. The method of claim 3, further comprising, when storing a copy of the file in the semantically secure encrypted form, also storing a decryption share of the user, wherein the decryption share is a portion of a private key that is used by the threshold encryption system.
5. The method of claim 4, wherein files reach the first level of popularity when a predetermined number of different users provide a copy of the file, the predetermined number being equal to the threshold of the threshold encryption system.
6. The method of claim 3, wherein storing a copy of the file in the semantically secure encrypted form comprises:
   encryption of the file with a semantically secure encryption scheme;
   determination of a random index;
   uploading at a location on the server associated to the random index, of the result of encryption the file with the semantically secure encryption scheme;
   application of the threshold encryption system to input data including the random index and data to invert the semantically secure encryption scheme; and
   uploading, on the server, of the result of applying the threshold encryption system.
7. The method of claim 6, wherein storing a copy of the file in the semantically secure encrypted form further comprises determination of a file index uniquely associated to the file, the upload on the server of the result of applying the threshold encryption system being performed at a location associated to the file index, wherein the file index is retrieved from an index map located apart from the server.
8. The method of claim 1, wherein the files are provided in a convergent encrypted form.
9. A non-transitory computer readable storage medium having computer readable instructions stored thereon that, when implemented by a computer, implement a method for performing remote data storage, the method comprising:
   receiving, by at least one client, files to be stored on a remote server;
   evaluating popularity of the files;
   storing the files on the server in a form that depends on the popularity of the files, files with a first level of popularity being stored in a deduplicated form and files with a second level of popularity being stored in an encrypted form, the first level of popularity being higher than the second level of popularity; and
   wherein the receiving includes repeatedly receiving copies of the same file by different users, thereby increasing popularity of the file, and wherein the method further comprises storing the copies in a semantically secure encrypted form before the file reaches the first level of popularity, and in the deduplicated form after the file has reached the first level of popularity.
10. The storage medium of claim 9, wherein the method further comprises, upon the file reaching the first level of popularity, decrypting previously stored copies in the semantically secure encrypted form and performing deduplication on the copies on the decrypted copies.
11. The storage medium of claim 10, wherein the semantically secure encrypted form results from application, by a user, of a threshold encryption system to data from which the file is derivable, wherein the threshold encryption system uses a threshold to determine when the file in the semantically secure encrypted form can be decrypted.
12. The storage medium of claim 11, wherein the method further comprises, when storing a copy of the file in the semantically secure encrypted form, also storing a decryption share of the user, wherein the decryption share is a portion of a private key that is used by the threshold encryption system.
13. The storage medium of claim 12, wherein files reach the first level of popularity when a predetermined number of different users provide a copy of the file, the predetermined number being equal to the threshold of the threshold encryption system.
14. The storage medium of claim 11, wherein storing a copy of the file in the semantically secure encrypted form comprises:
   encryption of the file with a semantically secure encryption scheme;
   determination of a random index;
   uploading at a location on the server associated to the random index, of the result of encryption the file with the semantically secure encryption scheme;
   application of the threshold encryption system to input data including the random index and data to invert the semantically secure encryption scheme; and
   uploading, on the server, of the result of applying the threshold encryption system.
15. The storage medium of claim 14, wherein storing a copy of the file in the semantically secure encrypted form further comprises determination of a file index uniquely associated to the file, the upload on the server of the result of applying the threshold encryption system being performed at a location associated to the file index, wherein the file index is retrieved from an index map located apart from the server.
16. A computer-implemented method for performing remote data storage, the method comprising:
   receiving, by at least one client, files to be stored on a remote server;
   evaluating popularity of the files, wherein the popularity of the file is increased based on repeatedly receiving copies of the same file by different users;

storing the files on the server in a form that depends on the popularity of the files, files with a first level of popularity being stored in a deduplicated form and files with a second level of popularity being stored in a semantically secure encrypted form, the first level of popularity being higher than the second level of popularity;

upon the file reaching the first level of popularity, decrypting previously stored copies in the semantically secure encrypted form and performing deduplication on the decrypted copies in the semantically secure encrypted form;

wherein the semantically secure encrypted form results from application, by a user, of a threshold encryption system to data from which the file is derivable, wherein the threshold encryption system uses a threshold to determine when decryption of the file in the semantically secure encrypted form is available; and wherein when storing a copy of the file in the semantically secure encrypted form, also storing a decryption share of the user, wherein the decryption share is a portion of a private key that is used by the threshold encryption system and the threshold is based on the number of decryption shares.

\* \* \* \* \*